United States Patent
Lepczyk

(10) Patent No.: US 10,525,987 B2
(45) Date of Patent: Jan. 7, 2020

(54) METHOD FOR AUTOMATIC USER ADAPTATION OF THE STIMULUS CHARACTERISTIC OF AN ACTIVE OPERATOR CONTROL ELEMENT OF A VEHICLE

(71) Applicant: Audi AG, Ingolstadt (DE)

(72) Inventor: Daniel Lepczyk, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 16/075,524

(22) PCT Filed: Jan. 12, 2017

(86) PCT No.: PCT/EP2017/050525
§ 371 (c)(1),
(2) Date: Aug. 3, 2018

(87) PCT Pub. No.: WO2017/133871
PCT Pub. Date: Aug. 10, 2017

(65) Prior Publication Data
US 2019/0047592 A1     Feb. 14, 2019

(30) Foreign Application Priority Data
Feb. 6, 2016   (DE) ..................... 10 2016 001 369

(51) Int. Cl.
*B60W 50/16*  (2012.01)
*B60K 26/02*  (2006.01)
*B60W 50/00*  (2006.01)

(52) U.S. Cl.
CPC .......... *B60W 50/16* (2013.01); *B60K 26/021* (2013.01); *B60K 2026/022* (2013.01);
(Continued)

(58) Field of Classification Search
None
See application file for complete search history.

(56) References Cited

U.S. PATENT DOCUMENTS 9,244,544 B2 *   1/2016  Matsuki ............... G06F 3/0485
10,004,435 B2 *  6/2018  Larvenz ............ A61B 5/14532
(Continued)

FOREIGN PATENT DOCUMENTS

DE      603 02 011       7/2006
DE     102005003886      8/2006
(Continued)

OTHER PUBLICATIONS

International Search Report issued by the European Patent Office dated May 9, 2017 in International Application PCT/EP2017/050525.

*Primary Examiner* — Shelley Chen
(74) *Attorney, Agent, or Firm* — Henry M. Feiereisen LLC

(57) ABSTRACT

A method for automatic user adaptation of a stimulus characteristic of an operator control element includes actuating the operator control element with a stimulus characteristic such that upon actuation by the operator, the operator control element transmits to the operator a tactually perceptible opposing force of predefined intensity which opposes the actuation force and/or a tactually perceptible oscillation of predefined intensity. Following the actuation of the active operator control element it is checked whether the reaction of the operator to the opposing force and/or oscillation occurs within a predefined time period. When the predefined time period is undershot, the intensity of the stimulus characteristic is reduced and stored, and when the time period is exceeded the intensity of the stimulus characteristic is increased and stored. The stored modified stimulus characteristic is used for the next actuation of the active operator control element by the vehicle control device.

14 Claims, 1 Drawing Sheet

(52) U.S. Cl.
CPC ............... *B60K 2026/023* (2013.01); *B60W 2050/0088* (2013.01); *B60W 2050/0089* (2013.01)

(56) References Cited

U.S. PATENT DOCUMENTS

| | | | |
|---|---|---|---|
| 10,004,436 B2* | 6/2018 | Larvenz | A61B 5/14532 |
| 2014/0160073 A1* | 6/2014 | Matsuki | G06F 3/0485 |
| | | | 345/174 |
| 2014/0316648 A1 | 10/2014 | Min | |
| 2015/0153828 A1* | 6/2015 | Monkhouse | G06F 3/044 |
| | | | 345/174 |
| 2015/0164390 A1* | 6/2015 | Larvenz | A61B 5/14532 |
| | | | 600/365 |
| 2016/0066826 A1* | 3/2016 | Larvenz | A61B 5/14532 |
| | | | 600/365 |
| 2016/0368376 A1 | 12/2016 | Lepczyk et al. | |

FOREIGN PATENT DOCUMENTS

| | | |
|---|---|---|
| DE | 102007032310 | 1/2009 |
| DE | 102009042899 | 4/2011 |
| DE | 102010010400 | 9/2011 |
| DE | 102011088266 | 6/2013 |
| DE | 102013222265 | 4/2015 |
| DE | 112012002576 | 10/2017 |

\* cited by examiner

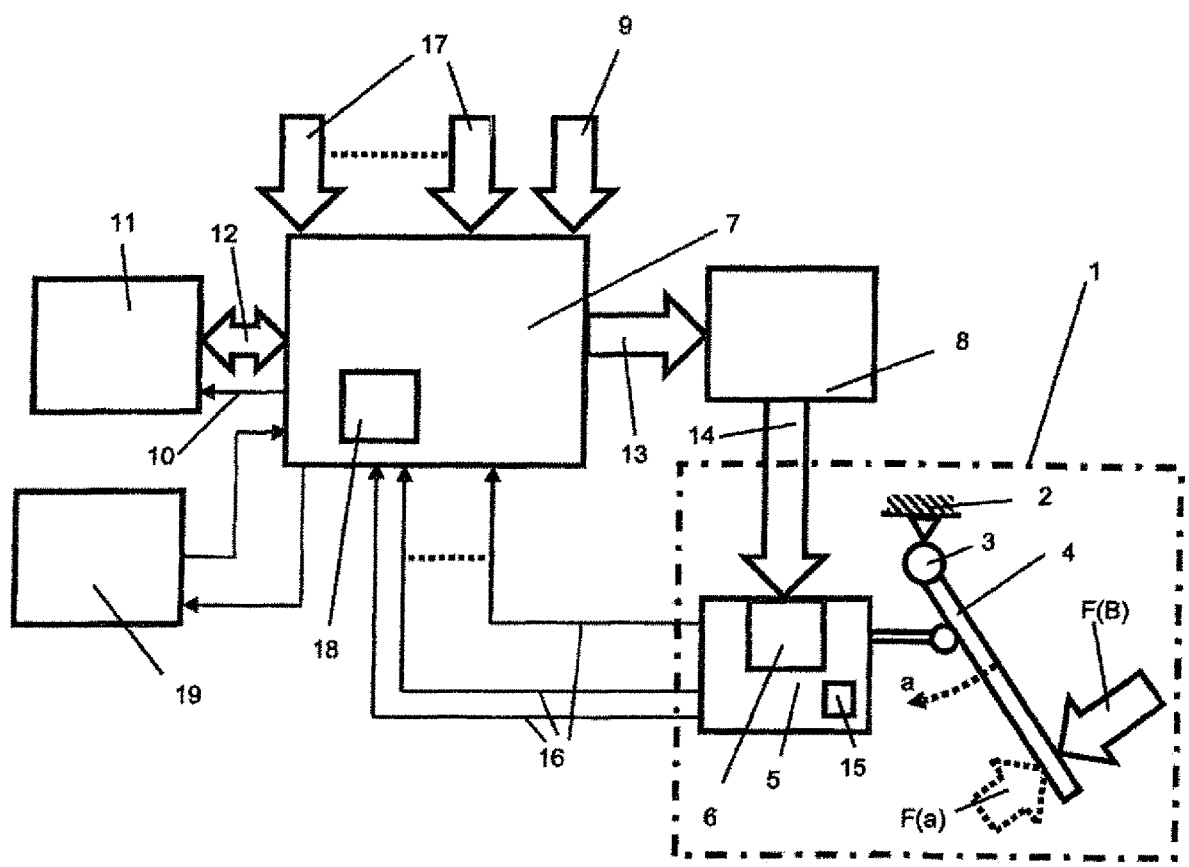

METHOD FOR AUTOMATIC USER ADAPTATION OF THE STIMULUS CHARACTERISTIC OF AN ACTIVE OPERATOR CONTROL ELEMENT OF A VEHICLE

CROSS-REFERENCES TO RELATED APPLICATIONS

This application is the U.S. National Stage of International Application No. PCT/EP2017/050525, filed Jan. 12, 2017, which designated the United States and has been published as International Publication No. WO 2017/133871 and which claims the priority of German Patent Application, Serial No. 10 2016 001 369.9, filed Feb. 6, 2016, pursuant to 35 U.S.C. 119(a)-(d).

BACKGROUND OF THE INVENTION

The invention relates to a method for automatic user adaptation of the stimulus characteristic of an active operator control element of a vehicle and an arrangement for implementation of the method.

While passive operator control elements due to their structural design can only provide passive feedback through their actuation haptics, active operator control elements are characterized by the fact that they can, unlike passive operator control elements, transmit tactually perceptible information to the user in the form of a stimulus via force or movement changes, depending on the situation. This force or movement change of active operator control elements is generated by actuation information, with which the active operator control element is actuated. This actuation information is referred to here as a stimulus characteristic.

Active operator control elements are recently increasingly being used in the automotive industry. First to mention here are active vehicle pedals and active steering wheels. Both are designed so that they either generate, dependent on the driving situation, a reaction force which is tactually perceptible by the operator and which opposes the operating force, or they generate, dependent on the driving situation, an oscillation in the actuating element which is tactually perceptible by the operator. In the first case, an actuator generating the opposing force is provided in the mechanics of the actuating element, in the second case, an oscillation generator is provided which applies to the operating element mechanical oscillations of preset frequency and amplitude. Such active operator control elements are usually used in conjunction with so-called assistance systems that serve to assist the driver in avoiding undesirable driving situations and/or operating situations. In the context of the facts discussed herein, such undesired driving situation and/or operating situation of the vehicle occurs when the operator has caused this particular undesirable driving situation and/or operating situation through the degree of actuation of the active operator control element and/or when the undesirable driving condition and/or operating situation can be reversed into a normal state by a change in the current degree of actuation of the active operator control element.

If, for example, a driver has approached with his vehicle an impending spin of the drive wheels due to excessive actuation of the accelerator pedal, a vehicle control unit equipped with a stability system can detect the impending spin of the wheels by evaluating corresponding sensor values and signal to the driver to step off the gas by building up a force opposing the actuating force of the accelerator pedal force. A vehicle control unit equipped with a lane departure warning assistance system can, for example, be designed such that it triggers, when leaving the lane, an oscillation generator which initiates oscillations in the steering wheel. In both cases, the driver is offered a tactually perceptible stimulus with a certain characteristic in order to avoid the undesired driving situation. Similarly, unwanted operating situations, for example the overspeeding of the engine, can be communicated tactually to the driver.

The examples mentioned above can be applied to many different driving situations and/or operating situations and to various operator control elements in such a way that pedals are caused to vibrate and a force opposing the steering force is applied to steering wheels.

Problematic in the choice of the intensity of the stimulus, i.e. the opposing force which is applied to the operator control element or the amplitude and frequency of the oscillation applied to the operator control element should meet two opposing requirements. On the one hand, tactual perception by the driver must be ensured; on the other hand, the strength of the tactual signal should not significantly affect the ride comfort.

In order to meet these contradictory requirements, it has already been proposed in DE 10 2010 010 400 A1 to make the force opposing the actuating force changeable in a pedal having a controllable damping element in such a way that this opposing force is increased compared to a basic value in a sport driving mode and decreased compared to a basic value in a comfort mode. Furthermore, the basic value should be adjustable by the driver.

Although the approach outlined here somewhat alleviates the problem of the choice of stimulus intensity, it requires, on the one hand, an active intervention from the driver, which in turn has a comfort-reducing effect and is associated with the aforementioned driving modes.

In DE 10 2007 032 310 A1 is proposed in conjunction with an active operating pedal of a commercial vehicle to design the adjustability of the opposing force by the operator such that the entire operating characteristic is customized and can be stored.

With this solution, too, a complex adjustment process by the operator is required, which may be adequate for agricultural machinery or construction machinery, but is not effective for passenger cars.

Furthermore, in DE 10 2011 088 266 A1 it is proposed, in order to avoid the manual adjustment of an opposing force generated by an accelerator pedal, to detect the weight of the driver and optionally his seating position via a driver's seat sensor. An opposing force is then set automatically depending on the detected variables.

Although this approach allows automatic adjustment of the generated opposing force, it is quite different from an individual setting, for example, because the differences between people of identical weight and, more importantly, the significant differences between experienced and inexperienced operators are not accounted for. Such an approach would always have to initially assume an inexperienced operator when selecting the opposing force who, as experiments have shown, requires for the perception of the perceptible tactual cues imparted by the accelerator pedal much larger opposing forces and/or amplitudes, i.e. completely different stimulus intensities, than for an operator familiar with the operation.

To overcome the disadvantages of the prior art, it is an object of the invention to provide a method and an arrangement for carrying out the method which makes it possible to automatically adjust the tactually perceptible stimulus intensity of an active operator control element for an operator individually, such that the stimulus, on the one hand, is clearly perceptible by the operator and, on the other hand, is selected so that the tactual perception of the stimulus is perceived by the operator as reducing the comfort only insignificantly.

SUMMARY OF THE INVENTION

The invention is based on the consideration that a stimulus can be considered as being perceived if a response provoked by the stimulus takes place within a period determined in tests. Based on this consideration, it is proposed to store at least one stimulus characteristic in a vehicle control device for automatic user adaptation of the stimulus characteristic of an active operator control element operable by an operator of a motor vehicle and to control the active control via the stimulus characteristic. The control takes place in such a way that, when actuated by the operator, the active operating element transmits to the operator a tactually perceptible opposing force of preset intensity opposing an actuating force and/or a tactually perceptible oscillation of preset intensity. After the activation of the active operator control element, it is then checked whether the reaction of the operator to the opposing force and/or the oscillation occurs within a preset time duration. The intensity of the stimulus characteristic is reduced and stored when having a duration of less than the preset time duration, and the intensity of the stimulus characteristic is increased and stored when the duration is greater than the preset time duration. The stored modified stimulus characteristic is then used for the next actuation of the active operator control element by the vehicle control device.

With the proposed method, the stimulus characteristic with which the vehicle control device controls the active operator control elements can advantageously automatically step-wise approach the threshold, where the active operator control element generates an opposing force and/or oscillation which is perceptible without being significantly disturbing.

After the threshold has been approached, the vehicle control device uses the stored, modified stimulus characteristic when detecting with the vehicle control device a specific driving situation and/or operating situation of the vehicle, and controls with it the active operator control element. In this way, the comfort is advantageously enhanced because the particular driving situation and/or operating situation of the operator is signaled with an opposing force and/or oscillation adapted to its haptic perception.

The timing of the operator's reaction to the opposing force and/or the oscillation is advantageously determined by detecting a change in the direction of actuation of the active operator control element by the operator and/or by detecting the termination of the operation of the active operator control element by the operator. For this purpose, a sensor is advantageously provided on the active operator control element, which detects the change in the direction of actuation by the operator or the termination of the operation by the operator. For this purpose, a specific variable detectable by the sensor is evaluated physically. When the active operating element is a pedal or the steering wheel, the sensor can be, for example, a rotational angle sensor coupled to the pedal or steering wheel, by means of which the vehicle control device determines the change of the rotational angle or the return of the rotational angle to a starting position.

To determine the optimum stimulus characteristic, it is also advantageous to repeat the process after each reduction in the intensity of the stimulus characteristic until the preset time duration is exceeded and then to increase the last used intensity by a preset amount and to store the thus modified stimulus characteristic. The stored modified stimulus characteristic is then used for the next control of the active operator control element.

In the course of determining the optimum stimulus characteristic, it is also advantageous to repeat the process after each increase in the intensity of the stimulus characteristic until the preset time duration is undershot and to then store the last-used modified stimulus characteristic. The stored modified stimulus characteristic is then used for the next activation of the active operator control element.

The optimum stimulus characteristic is advantageously determined after each start of the vehicle. This can be done, for example, in a learning routine preceding the actual driving operation. For this purpose, the operator can be automatically requested to operate the active operator control element and then, starting with a lower one intensity base value of the stimulus characteristic, to actuate the active operator control element by means of the vehicle control device and to increase the intensity of the stimulus characteristic step-wise until the reaction by the operator falls within the specified time duration. The last used intensity is then the intensity one is looking for. The stimulus characteristic with the intensity thus found can then be used directly for the actuation; however, it may also be advantageous to increase in the intensity by a preset amount in order to ensure that the stimulus can thereby be reliably detected of by the operator. The thus modified stimulus characteristic is then used to actuate the operator control element when a driving situation and/or operating situation of the vehicle has been detected, which should be reported to the driver and thereby avoided.

Because training routines to be performed before the actual driving always diminish comfort, it is particularly advantageous to perform the user adjustment when a specific driving situation and/or operating situation is detected by the vehicle control device. In this case, the intensity of the stimulus characteristic is reduced when falling below the preset time duration and the modified stimulus characteristic is stored, and the stored modified stimulus characteristic is used for controlling the active operator control element at the next occurrence of the driving situation and/or operating situation detected by the vehicle control device. When the predefined time duration is exceeded, the intensity of the stimulus characteristic is increased immediately, the modified stimulus characteristic is stored, and the active operating element is immediately actuated. The process is repeated consecutively until the time duration is exceeded. The last used intensity, optionally with a safety margin, is then used for the modified stimulus characteristic, stored and used for actuating the active operator control element at the next occurrence of the driving situation and/or operating situation detected by the vehicle control device.

As already indicated, this approach advantageously enhances the comfort, because an upstream teaching routine is eliminated. The delay that occurs when the intensity of the stimulus is successively increased is not significant, because the number of intensity steps is rather small and the tactual channel in humans has anyway the highest stimulus response rate. It may be beneficial to continue the process during the further driving operation, i.e. finding the appropriate stimulus characteristic, in order to continuously adjust the intensity of the stimulus characteristic.

Since stimulus perception in humans depends very strongly on environmental conditions, it is further advantageous to modify the stored stimulus characteristic depending on environmental conditions and/or driving conditions detected by the vehicle control device via sensors prior to controlling the active operator control element. The active operator control element is then controlled with the modified stimulus characteristic such that the active operator control element generates a tactually perceptible modified opposing force opposing the actuation force and/or a tactually perceptible modified oscillation which is adapted to the detected environmental conditions. The stored stimulus characteristic, i.e. the actuation information stored in a memory, is advantageously not changed, so that the stored stimulus characteristic can be used unchanged when the detected environmental condition ceases to exist.

The term of environmental conditions preferably refers the outside temperature and/or the road surface condition and/or the road layout and/or the vehicle environment. A low outside temperature suggests heavier footwear or gloves of the operator, indicating the need for a stimulus with a slightly higher intensity. The same applies if the road surface is rough. In this case, opposing forces and oscillations will be perceived by the operator to a lesser degree than on smooth road surfaces. A curvy road layout or a high ambient noise level also requires higher stimulus intensity in order to perceive a tactually stimulus.

After the active operator control element is arranged in a vehicle, the driving conditions to which the vehicle is subjected must also be taken into account for the variables influencing the tactual stimulus threshold. In particular, the vehicle speed and/or the yaw rate of the vehicle and/or the longitudinal acceleration of the vehicle and/or the transverse acceleration of the vehicle influence the tactual perception. When these variables increase, the intensity of the stimulus must also be modified in order to be perceived by the operator. Again, it is here also advantageous to use a modified stimulus characteristic, for example, a higher intensity, when the particular variable are increased, by modifying the stored stimulus characteristic before the actuation of the active operating element in a manner depending on the driving conditions and to use these for actuating the active operator control element. In this case, the stored stimulus characteristic itself, i.e. the actuation information stored in a memory, is likewise advantageously not changed, so that the stored stimulus characteristic can be used unchanged in the event the detected driving condition ceases to exist.

Advantageously, in an arrangement for carrying out the method, at least one stimulus characteristic is stored in the vehicle control device, which defines how the vehicle control device actuates the active operator control element, so that this element then supplies a tactually perceptible opposing force of preset intensity opposing the actuating force and/or a tactually perceptible oscillation. The vehicle control device is designed so that it actuates with the at least one stimulus characteristic the active operator control element for automatic user adaptation and compares the time elapsed between the beginning of the control and the reaction of the operator to the opposing force and/or oscillation after the active operator control element is actuated with a preset duration. Furthermore, the vehicle control device is designed to decrease and store the intensity of the stimulus characteristic when the preset time duration is undershot, and to increase and store the intensity of the stimulus characteristic when the time duration is exceeded, and to then use the stored modified stimulus characteristic for the next control of the active operator control element.

To determine the time that has elapsed between the actuation of the active operator control element and the reaction of the operator to the opposing force and/or oscillation, the vehicle control device advantageously includes a counter that can be incremented or decremented in increments of time. The vehicle control device starts the counter upon actuation of the active operator control element. Moreover, the vehicle control device is designed to determine for an incrementable counter that the time period is exceeded when a specified first counter reading is reached or to determine for a decrementable counter that is set with a preset counter reading that the time period has been exceeded when a preset second counter reading is reached. A counter that is incrementable or decrementable in time increments represents a simple and therefore advantageous means to detect a time duration.

Furthermore, it is advantageous to equip the vehicle control device with sensors to determine the environmental conditions and/or driving conditions. The environmental conditions and/or driving conditions determined with the sensors are converted by the vehicle control device into a correction value for the stimulus characteristic. This can be done, for example, in that the vehicle control device first determines by querying the sensor, when a specific driving situation and/or operating situation is detected by the vehicle control device, whether environmental and/or driving conditions are present, which require a correction of the stimulus characteristic. If this is the case, the vehicle control device addresses a memory depending on the determined environmental and/or driving conditions, reads from the memory the correction value, and modifies the stored stimulus characteristic with the correction value. The vehicle control device then uses the modified stimulus characteristic for the next actuation of the active operator control element.

It should be noted that the system components described above and also below, such as the vehicle control device, need not necessarily be designed as hardware components. It is rather common nowadays to implement such components as software routines that are executed by processing units and use existing hardware components such as sensors, actuators, etc. Vehicles in operation today usually have several such processing units, which are networked together for data transmission and perform a wide variety of control, regulation, analysis, monitoring and data transmission routines. Likewise, a variety of sensors and actuators which can be used in part for different purposes are used in today's vehicles. The terms sensors and actuators are to be understood to have their most general meaning. The methods or parts of the method described above and below are executed by the above-mentioned processing units as program-supported control processes. This is also common today and needs no further explanation.

BRIEF DESCRIPTION OF THE DRAWING

Further embodiments and advantages of the invention will be explained below in more detail with reference to the drawing which shows in:

FIG. 1 schematically in form of a block diagram an arrangement for automatic user adaptation of the stimulus characteristic of an operator-actuatable active operator control element of a vehicle.

DETAILED DESCRIPTION OF PREFERRED EMBODIMENTS

Before describing by way of example the method for automatic user adaptation of the stimulus characteristic of an active operator control element of a motor vehicle in detail, it appears necessary to first explain the characteristic properties of the apparatus is shown in FIG. 1 in form of a block diagram showing schematically by way of example the most important components.

An active operator control element 1 composed of a pedal 4 mounted on the vehicle 2 for rotation about a point 3, a pedal mechanism 5, and an actuator 6, is actuated by a vehicle control device 7 via a driver circuit 8. The actuation serves, on the one hand, to generate a preset operating haptics of the pedal 4 during normal driving operation of the vehicle 2 and, on the other hand, to transmit signals that can be tactually perceived by the operator in certain driving situations and/or operating situations detected by the vehicle control device 7.

Commensurate with the selected example, such driving situation and/or operating situation of the vehicle is present when the user has caused this particular driving situation and/or operating situation by virtue of the current degree of actuation of the active operating element 1 and/or the particular driving situation and/or operating situation can be returned to a normal state by changing the degree of actuation.

To determine the presence of the particular driving situations and/or operating situations, the vehicle control device 7 is connected to unillustrated sensors via first lines 9, wherein the vehicle control device 7 detects the presence of certain driving situations and/or operating situations by evaluating the sensors and by evaluating the current degree of actuation of the active operating element 1. If such a specific driving situation and/or operating situation is present, the vehicle control device 7 addresses a memory 11 via address lines 10 and reads out a stimulus characteristic via bidirectional data lines 12. As already stated at the outset, a stimulus characteristic is understood to represent actuation information which the vehicle control device 7 applies to the driver circuit 8 via control lines 13 and to the active operator control element 1 via the driver circuit 8 and these lines 14. The application is dependent on the operating angle, i.e. the actuator 6 of the active operator control element 1 is thus actuated by the vehicle control device 7 as a function of the operating angle α of the pedal 4 so that the actuator 6 generates a certain opposing force F(α) via the pedal mechanism 5, which opposes the actuating force F(B) of the pedal 4 and is thus tactually perceptible by the operator. The vehicle control device 7 hence generates by way of the stimulus characteristic an opposing force behavior that depends on the operating angle α, by means of which tactually perceptible information can be transmitted to the user.

The operating angle α is detected by a measuring device 15 contained in the active operating element 1 and transmitted to the vehicle control device 7 via one of the control lines 16. The operating angle α is used to derive from the stimulus characteristic the control data to be applied to the driver circuit 8, in order to generate the correct opposing force F(α) on the pedal. 4 for the respective operating angle α.

In order to be able to correct the control data to be applied to the driver circuit 8 dependent on the presence of certain environmental conditions and/or driving conditions, it is provided that the vehicle control device 7 evaluates the data from additional unillustrated sensors via sensor connections 17. Depending on the result of the evaluation, the need for a correction and its magnitude is determined by the vehicle control device 7 and a correction value is taken from a correction value memory 19, with which the vehicle control device 7 modifies the stimulus characteristic.

To carry out the method, a counter 18 which can be incremented in increments of time is additionally provided in the vehicle control device, wherein the counter reading is compared after each incrementing with a preset value to determine a preset time duration. The counter is stopped, on the one hand, when the preset value is reached and, on the other hand, when the operating angle α of the pedal 4 is decreased. This is detected by monitoring the operating angle α with the vehicle control device 7.

The stimulus characteristic is automatically adapted to a user with the arrangement described above in that the vehicle control device 7—after starting the vehicle 2—checks by evaluating the unillustrated sensors connected via the lines 9 and the operating angle α whether a certain driving situation and/or operating situation is present. If this is the case, the vehicle control device 7 addresses the memory 11 via address lines 10 and reads via the bidirectional data lines 12 the stimulus characteristic stored in the memory 11. Using the stimulus characteristic on the one hand and the operating angle α on the other hand, the vehicle control device 7 generates the actuation information for the driver circuit 8. The driver circuit 8 actuates the actuator 6 and thus generates the opposing force F(α).

At the same time the driver circuit 8 is actuated, the vehicle control device 7 starts the counter 18 which can be incremented in time increments and compares the counter reading after each incrementing with a preset counter reading. When this counter reading is reached before the vehicle control device detects a decrease in the monitored operating angle α, the vehicle control device 7 registers that the time duration is exceeded and increases the intensity of stimulus characteristic by modifying the original stimulus characteristic with a preset positive offset. The vehicle control device 7 then stores the modified stimulus characteristic in the memory 11 and immediately thereafter controls the active operator control element 1 again with the modified stimulus characteristic from the memory 11. The process is repeated successively until the counter 18 is stopped by a reduction of the operating angle α of the pedal 4 before the preset count is reached. In this case, the vehicle control device 7 registers a time undershot and retains the currently used stimulus characteristic in the memory 11 which is then used for controlling the driver circuit 8 at the next occurrence of the particular driving situation and/or operating situation.

If, during control of the driver circuit 8 with the stimulus characteristic currently stored in memory 11, the counter 18 started by the control is stopped by a decrease of the operating angle α of the pedal 4 before the preset counter value is reached, the vehicle control device 7 registers that the time duration is undershot. In this case, the vehicle control device 7 modifies the most recently used stimulus characteristic with a preset negative offset and stores the modified stimulus characteristic in the memory 11. At the next occurrence of the particular driving situation and/or operating situation, the vehicle control device 7 then uses this stimulus characteristic contained in the memory 11 to control the driver circuit 8.

The method remains active during the entire operating time of the vehicle and always maintains the stimulus characteristic in a range in which the stimulus is clearly perceptible for the operator without being disturbing.

As an extension of the above-described example of the method according to the invention, the presence of specific environmental and/or driving conditions can be checked before controlling the driver circuit by evaluating additional unillustrated sensors connected to the vehicle control device 7 via sensor connections 17. Upon detection of the particular environmental conditions and/or driving conditions, the vehicle control device 7 modifies the stimulus characteristic read from the memory 11 with a positive offset derived from the detected environmental and/or driving conditions, and controls the driver circuit 8 with the thus modified stimulus characteristic. In this way, the environmental dependence of the stimulus perception by the operator is compensated.

In an embodiment different from the example described above, an unillustrated oscillation generator may be used instead of the actuator 6 generating the opposing force (F($\alpha$)). In this case, the stimulus characteristic contains information regarding the control of a driver circuit powering the oscillation generator, so that the oscillation generator transmits to the operator, via the pedal mechanism 5, an oscillation corresponding to the stimulus characteristic. In all other aspects, the method proceeds and the arrangement for carrying out the method is implemented as described above.

What is claimed is:

1. A method for automatic user adaptation of a stimulus characteristic of an operator-actuatable active operator control element of a vehicle, comprising:
   storing the stimulus characteristic in a vehicle control device;
   actuating with the vehicle control device the active operator control element with the stimulus characteristic, such that the active operator control element transmits to the operator, when actuated by the operator, a tactually perceptible opposing force of preset intensity which counteracts an actuation force or a tactually perceptible oscillation of preset intensity, or both,
   checking, after actuation of the active operator control element, whether the reaction of the operator to the opposing force or to the oscillation occurs within a preset time duration, and
   when the actuation of the active operator control element occurs before the preset time duration has expired, reducing the intensity of the stimulus characteristic and storing the reduced intensity of the stimulus characteristic as modified stimulus characteristic, and
   when actuation of the active operator control element occurs after the preset time duration has expired, increasing the intensity of the stimulus characteristic and storing the increased intensity of the stimulus characteristic as modified stimulus characteristic, and
   using the modified stimulus characteristic for a next actuation of the active operator control element.

2. The method of claim 1, and further comprising, when the vehicle control device detects an occurrence of a particular driving situation and/or operating situation of the vehicle, actuating the active operator control element with the vehicle control device with the stored modified stimulus characteristic.

3. The method of claim 1, and further comprising determining a time of the reaction of the operator to the opposing force and/or to the oscillation by detecting a change in a direction of actuation of the active operator control element by the operator and/or by detecting a conclusion of the actuation of the active operator control element by the operator.

4. The method of claim 1, and further comprising, after each reduction of the intensity of the stimulus characteristic, repeating the method steps of claim 1, until the preset time period is exceeded, and thereafter increasing the intensity by a preset amount and storing the stimulus characteristic with the increased intensity as modified stimulus characteristic, and using the stored modified stimulus characteristic for a next actuation of the active operator control element.

5. The method of claim 1, and further comprising, after each increase of the intensity of the stimulus characteristic, repeating the method steps of claim 1, until the preset time is undershot, and storing a last used modified stimulus characteristic, and using the stored modified stimulus characteristic for a next actuation of the active operator control element.

6. The method of claim 1, wherein the automatic user adaptation is performed after each start of the vehicle.

7. The method of claim 1, wherein the user adaptation is performed when the vehicle control device detects a specific driving situation and/or operating situation, the method further comprising:
   when the preset time duration is undershot, reducing the intensity of the stimulus characteristic and storing the modified stimulus characteristic and using the modified stimulus characteristic for actuating the active operating element in the next occurrence of the driving situation and/or operating situation detected by the vehicle control device, and
   when the preset time duration is exceeded, increasing the intensity of the stimulus characteristic immediately thereafter, storing the modified stimulus characteristic and immediately actuating the active operator control element, and successively repeating method steps of claim 1 until the time duration is undershot, and using the modified stimulus characteristic for actuating the active operating element in the next occurrence of the driving situation and/or operating situation detected by the vehicle control device.

8. The method of claim 1, further comprising:
   modifying the stored stimulus characteristic in dependence of environmental conditions and/or driving conditions detected by the vehicle controller with sensors before actuation of the active operator control element, and
   actuating the active operator control element with the modified stimulus characteristic such that the active operator control element generates a modified tactually perceptible opposing force opposing the actuating force and/or a tactually perceptible modified oscillation.

9. The method of claim 8, wherein the environmental conditions comprise an outside temperature, a road surface condition, a road course or the vehicle surroundings, or a combination thereof.

10. The method of claim 8, wherein the driving conditions comprise a vehicle speed, a yaw rate, a longitudinal acceleration or a transverse acceleration of the vehicle, or a combination thereof.

11. An arrangement for automatic user adaptation of a stimulus characteristic of an operator-actuatable active operator control element of a vehicle, comprising:
   an operator control element,
   a vehicle control device comprising a counter and connected to the operator control element,
   a memory connected to the vehicle control device and storing a stimulus characteristic, with the operator control element comprising an actuator which outputs a tactually perceptible opposing force of preset intensity opposing an actuating force and/or a tactually perceptible oscillation of preset intensity and which actuates the operator control element commensurate with the stored stimulus characteristic, wherein the counter, after actuation of the active operator control element, compares a time duration which has elapsed between a start of the actuation of the active operator control element and a reaction of the operator to the opposing force and/or the oscillation and determines whether the time duration is within a preset time duration, wherein when the time duration falls below the preset time duration, the vehicle control device reduces the intensity of the stimulus characteristic and stores the stimulus characteristic with the reduced intensity as a modified stimulus characteristic, when the time duration exceeds the preset time duration, the vehicle control device increases the intensity of the stimulus characteristic and stores the stimulus characteristic with the increased intensity as a modified stimulus characteristic, and wherein the vehicle control device uses the modified stimulus characteristic for a next actuation of the active operator control element.

12. The arrangement of claim 11, wherein the counter is incremented in time increments, and wherein the vehicle control device is designed to detect that the time period is exceeded when the counter reaches a preset first count.

13. The arrangement of claim 11, wherein the counter of the vehicle control device is decremented in time increments, and wherein the vehicle control device is designed to detect that the time period is exceeded when the counter reaches a second preset second count.

14. The arrangement of claim 11, wherein the vehicle control device is connected to sensors detecting environmental conditions and/or driving conditions of the vehicle, and wherein the vehicle control device is configured to determine, based detection of predefined environmental conditions and/or driving conditions, a correction value for the stimulus characteristic, to modify the stored stimulus characteristic with the correction value, and to use the modified stimulus characteristic for the next actuation of the active operator control element.

* * * * *